United States Patent
Tantlinger

[11] 3,806,188
[45] Apr. 23, 1974

[54] CONTINUOUS HINGE AND SEAL FOR VEHICLE WINDOWS

[75] Inventor: Keith W. Tantlinger, Coronado, Calif.

[73] Assignee: Rohr Industries, Inc., Chula Vista, Calif.

[22] Filed: June 29, 1972

[21] Appl. No.: 267,427

[52] U.S. Cl................. 296/146, 16/150, 49/141, 49/488, 49/489
[51] Int. Cl............................................. B60j 1/14
[58] Field of Search......... 296/146; 16/150; 49/141, 49/488, 489

[56] References Cited
UNITED STATES PATENTS

| | | | |
|---|---|---|---|
| 2,639,790 | 5/1953 | Reitzel | 49/141 |
| 2,507,965 | 5/1950 | Eichner | 16/150 |
| 3,082,491 | 3/1963 | Millhouse et al. | 49/489 |
| 2,787,348 | 4/1957 | Goodemote et al. | 49/141 |
| 2,793,723 | 5/1957 | Martin | 49/489 X |
| 3,128,120 | 4/1964 | Fournier et al. | 16/150 X |

FOREIGN PATENTS OR APPLICATIONS

| | | | |
|---|---|---|---|
| 359,871 | 3/1962 | Switzerland | 16/150 |
| 108,292 | 9/1958 | Pakistan | 49/488 |

Primary Examiner—David Schonberg
Assistant Examiner—Leslie J. Paperner

[57] ABSTRACT

A continuous hinge seal strip of tough, resilient, plastic material is mounted along the aligned upper edges of the window openings on each side of a transportation type vehicle. Each window comprises a glass panel, the upper edge of which is connected in sealed relation to the hinge strip. Vertical edges of adjacent windows seal against resilient seal strips mounted on mullions which separate the window openings, and the lower edges of the windows seal against a preferably continuous seal strip mounted along the aligned lower edges of the window openings.

9 Claims, 4 Drawing Figures

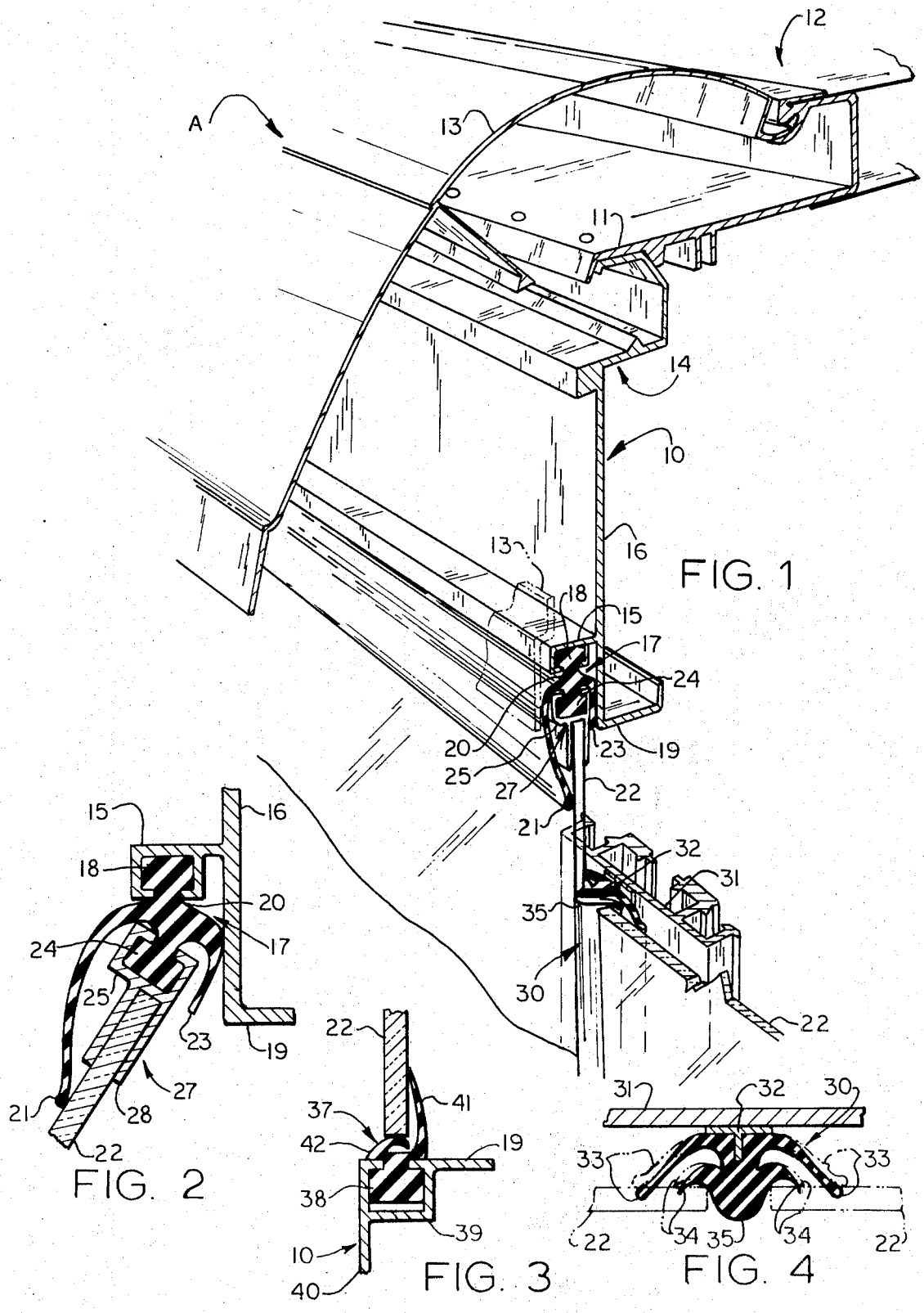

CONTINUOUS HINGE AND SEAL FOR VEHICLE WINDOWS

BACKGROUND OF THE INVENTION

In the manufacture of modern transportation type vehicles such as buses and mass transport type trains, the trend in window construction is strongly toward the use of a single panel of glass or other suitable transparent material for each window. This reduces to a minimum the number of parts and operations involved in the manufacture of the window, but at the same time it presents problems in providing safe and secure mounting, adequate sealing, ease and precision of operation and facility of emergency escape.

PURPOSE OF THE INVENTION

A primary objective of the invention is to provide an improved window mounting structure for a transportation type vehicle.

A further objective of the invention is to provide an improved, continuous hinge seal strip along the aligned upper edges of a row of windows of a transportation type vehicle, said strip being in pressure sealing relation throughout its length with portions of the vehicle body, the windows being individually hingedly connected in sealed relation to said strip.

A further objective is to provide such mounting structure with the individual windows hingedly suspended from the strip, their side edges closing against resilient sealing strips mounted between adjacent window openings, and their lower edges closing against a preferably continuous sealing strip mounted along the aligned lower edges of the window openings.

BRIEF DESCRIPTION OF THE DRAWINGS

The foregoing objectives and advantages of the invention will be apparent from the following description and the accompanying drawings, wherein:

FIG. 1 is a fragmentary, perspective view of the upper side wall and roof joint area of a bus body having the invention embodied therein, portions being broken away.

FIG. 2 is an enlarged, fragmentary, sectional view showing the hinged mounting structure for one of the windows of FIG. 1, the window being swung outwardly to open position.

FIG. 3 is a fragmentary, sectional view showing the seal for the lower edge of a window of the type shown in FIGS. 1 and 2 as it appears with the window closed.

FIG. 4 is a transverse, sectional view through one of the seals for the vertical edges of two adjacent windows, edge portions of the windows being shown in broken lines in their closed position.

DETAILED DESCRIPTION OF THE DRAWINGS

Referring to the drawings in detail, the body A of a transportation type vehicle such as a bus, or a car for a mass transportation system, comprises side wall 10 connected in supporting relation by a riveted joint 11 to the roof structure 12 having a swing-out access panel 13 removably connected thereto. The upper portion of the side wall 10 comprises an extrusion 14 having downwardly open channel portion 15 formed integrally on the outer side thereof. The lower edges of the side walls of this channel portion 15 are turned inwardly toward each other, so that the side walls of the channel are in effect undercut, and this term is used to indicate such a channel throughout the present specification and claims. The channel portion 15 is spaced upwardly a slight distance from the flanged lower edge of an upright panel portion 16 of the extrusion 14.

A combined window hinge and seal strip 17 is of suitable tough, resilient, weather resistant material, such as polypropylene, and has a thick upper edge portion 18, which is fitted in retained position into the channel portion 15. The hinge and seal strip 17 preferably is continuous throughout the length of a row of window openings 19 along each side of the vehicle body A. Below the thick upper edge portion 18, the thickness of the strip 17 is reduced to provide a flexible web portion 20, and an outwardly and downwardly curved sealing flange 21 is formed integrally along the outer side of the web portion 20, the curvature of the flange 21 being such that the lower edge thereof is biased inwardly by the resiliency of the material of which the strip 17 is made into sealing contact with a window member 22 to be described later herein. An intermediate portion of the outer sealing flange 21 is also in sealing contact with the lower, marginal portion of the access panel 13 when the latter is swung downwardly and inwardly to its closed position, indicated in broken lines in FIG. 1. A generally similar, but narrower, inner sealing flange 23, integral with the inner side of the web portion 20, curves inwardly and downwardly to bear in sealing relation against the panel portion 16 of the extrusion 14, below the channel portion 15, and is biased thereby into sealing relation with each window member 22 when the latter is closed as shown in FIG. 1.

A thick lower edge portion 24 is also provided on the hinge and seal strip 17, said lower edge portion being generally similar to and thick upper edge portion 18. The thick lower edge portion 24 is fitted in retained position into the upper channel 25 of a two-channel member 27, which may be an extrusion of suitable material, such as aluminum. The upper channel 25 of each two-channel member 27, like the channel portion 15, has undercut side walls to retain the thick lower edge portion 24 of the hinge and seal strip 17 when the latter is fitted therein. A downwardly open channel 28 is also provided in each two-channel member 27 and the upper edge of an associated window member 22 is fitted and retained therein, as by means of a suitable adhesive. Each two-channel member 27 is co-extensive with the upper edge of the window member 22 upon which it is mounted.

Each window member 22 comprises a single sheet of suitable transparent material, such as tempered or safety glass, or plastic, and the side edges of adjacent window members seal when closing against sealing members 30, see FIGS. 1 and 4, mounted on mullions 31, provided between adjacent window openings. Each mullion 31, provided between adjacent window openings. Each mullion 31 is an extrusion of suitable material, such as aluminum, and has a preferably flat outer face substantially parallel to the general plane of the side wall of the vehicle body A. An attaching rib 37 is mounted along the center of the flat outer face of each mullion 31, and fits snugly into a central groove provided lengthwise of the inner side of each sealing member 30, where it may be retained by means of a suitable adhesive.

Long and short integral, curved, sealing flanges 33 and 34 extend laterally in opposite directions from the central portion of the sealing member 30, and in their normal position, shown in solid lines in FIG. 4, engage their respective window members 22 slightly in advance of closing, as shown in FIG. 1, and in broken lines in FIG. 4. A center rib portion 35 is provided along the outer side of each sealing member 30 to fit between adjacent windows.

A bottom sealing strip 37, like the upper hinge and seal strip 17, preferably is continuous throughout the length of a row of window openings 19 along each side of a vehicle body. The bottom sealing strip 37 has a thick lower edge portion 38 fitted into a channel portion 39 with undercut side walls formed in a vehicle body extrusion 40. A curved inner flange 41 extends upwardly from the thick lower edge portion 38, for resilient, sealing engagement with the inner side of each window member 22 when closed, and a short, curved outer flange 42 which also is provided for wiping, sealing engagement with the lower edge of each window member 22 when enclosed.

For inserting the thickened edge portions of the upper and lower sealing strips into their respective channels, the leading end of a selected thickened edge portion is first introduced into its respective channel. The leading end of the strip to be introduced is then subjected to tension by suitable pulling means, not shown, and the thickened edge portions thus drawn to a desired position in its channel. In the event that the thickened edge portion thus being introduced should tend to stall or hang up at any point during such insertion, continued exertion of the pulling force elongates, and thereby narrows, the resilient sealing strip, thus releasing it for further advancement.

OPERATION OF THE ILLUSTRATIVE HINGE SEAL

With a row of window openings 19 along each side of the body A of a transportation type vehicle, the window members 22 closed as shown in FIGS. 1 and 3, and in broken lines in FIG. 4, and the access panel 13 also closed as shown in broken lines in FIG. 1, the lower marginal portion of the access panel 13 bears in sealing relation against the outer, curved, sealing flange 21 of the hinge and seal strip 17, thereby excluding outside air from the zone between the access panel 13 and the side wall extrusion 14. Pressure of the access panel against the curved outer flange 21 urges the lower edges of the latter flange toward firm, sealing relation with the window member 22. The upper and lower thick edge portions 18 and 24 of the hinge and seal strip 17, being in fitted, retained position in their respective channels 15 and 25, as described previously herein, provide an effective seal between the extrusion 14 and the window members 22 mounted thereon, and the inner curved flange 23 is urged by its contact with the lower marginal portion of the extrusion 14 into sealing relation with the two-channel member 27 when the window members are swung to their closed position as shown in FIG. 1.

In thus swinging to closed position, the upright, marginal, side portions of adjacent window members 22, see FIGS. 2 and 4, fit snugly alongside the outer ribs 35 of their respective sealing members 30, and displace inwardly the respective, curved, sealing flanges 33 and 34 against which they thus bear resiliently. The bottom sealing strip 37 also provides a snug, effective, double seal, against both the bottom edge and the inner side of each window member when the latter is closed.

The continuity of the hinge seal strip 17 throughout the length of an entire row of windows obviates the necessity of providing separate joints and seals at each side of each window, and also provides an effective seal for the zone interiorly of the access panel 13. The seals 30 between adjacent windows eliminate the necessity of window frames and casings, and provide effective sealing for the sides of the windows.

When it becomes necessary to replace a broken window, a short length of the thick lower edge portion 24 of the seal strip 17 between the window to be replaced and one next to it is notched out as by means of a suitable nibbling tool, not shown, provided to maintenance personnel responsible, or simply by means of a sharp knife. This permits the end of the double channel member 27 of the broken window to be offset outwardly, clear of the window next to it, and withdrawn. The replacement window is mounted by reversing this procedure, suitable means being employed to grasp the end of the thick edge portion 24 provided by the notching operation to draw it into the upper channel of the member 27 on the replacement window.

The invention provides a modern, clean, all-glass appearance to each row of windows in which it is embodied, and the continuous bottom seal strip 37 like the hinge seal strip 17, has many of the latter's advantages pointed out previously herein.

The windows are easy to open to their position shown in FIG. 2, or further if required for emergency escape, and may be provided with suitable or conventional locks, which, not being a feature of the present invention, are omitted.

Having thus described my invention, what I claim as new and desire to secure by U. S. letters Patent is:

1. A window mounting hinge structure for a transportation type vehicle having a row of window openings, the upper and lower edges of which are aligned, along each side thereof, said hinge structure comprising a downwardly open channel extending along a portion of the vehicle structure defining the aligned upper edges of each row of window openings, and substantially co-extensive with its respective row of window openings, a plurality of window panels, each of a size to fit one into each of said window openings, an upwardly open channel portion extending along the upper edge of each window panel and substantially co-extensive therewith, a resiliently flexible, continuous hinge strip of a length corresponding substantially to that of said downwardly open channel, and comprising a thick upper edge portion fitted in retained condition into the downwardly open channel, a thick lower edge portion fitted in retained condition into the upwardly open channel of each window panel, and an intermediate web portion, at least a portion of which is of less thickness than said edge portions, interconnecting the two edge portions and suspending each window panel for hinged movement in an associated one of the window openings, said intermediate web portion having an outwardly and downwardly curved sealing flange provided on the outer side of the web portion of each hinge step and extending outwardly between said channels, the flange being so curved, and of sufficient length to bring the lower edge thereof into biased, sealing relation with the outer side of each of the window panels, and seal means mounted on the vehicle structure defining the side and bottom edges of each window opening, said seal means being constructed and arranged to seal the side and lower edges of each window panel in its downswung, closed position.

2. A window mounting hinge structure as claimed in claim 1 wherein each of the channels has undercut side walls to facilitate retention of the thick edge portions of the hinge strip therein.

3. A window mounting hinge structure as claimed in claim 1 wherein a swing-out access panel is provided in each side of said vehicle above each row of window openings therein, and the lower edge portion of each of said swing-out panels, when closed, is in pressure sealing relation with the outer side of said curved flange.

4. A window mounting hinge structure as claimed in claim 1 wherein a second, inwardly and downwardly curved sealing flange is provided on the inner side of the web portion of each hinge strip, and each of said second curved sealing flanges is gripped in sealing relation between each window panel and a portion of the vehicle structure inwardly thereof upon the closing of said each window panel.

5. A window mounting hinge structure as claimed in claim 2, wherein the means for sealing the lower edge of each window panel comprises a resiliently flexible, continuous seal strip mounted on the vehicle structure defining the aligned lower edges of the window openings of each row thereof, and said latter seal strip is positioned to be flexed into sealing engagement with each window panel upon the closing of said each window panel.

6. A window mounting hinge structure as claimed in claim 1 wherein each window panel comprises a single panel of clear, transparent material.

7. A window mounting hinge structure as claimed in claim 6 wherein the upwardly open channel extending along the upper edge of each window panel is provided by a double channel member comprising a downwardly open channel portion on the lower side thereof fitted in retained condition onto the upper edge of each window panel, and the upwardly open channel portion defined in claim 2 on the upper side thereof.

8. A window mounting hinge structure as claimed in claim 1 wherein a mullion divides each adjacent pair of window openings, a sealing strip of resilient material is affixed to the outer face of each of said mullions, a rib extends lengthwise of the outer face of each strip and is interposed between the upright edges of adjacent window panels when the latter are in closed position.

9. A window mounting hinge structure as claimed in claim 8 wherein a resilient sealing flange extends outwardly from each side of said interposed rib, each of said latter flanges being positioned with the free edges thereof located to be engaged and flexed into sealing engagement with the window panels between which said rib is interposed upon the closing of its respective window panels.

* * * * *